UNITED STATES PATENT OFFICE.

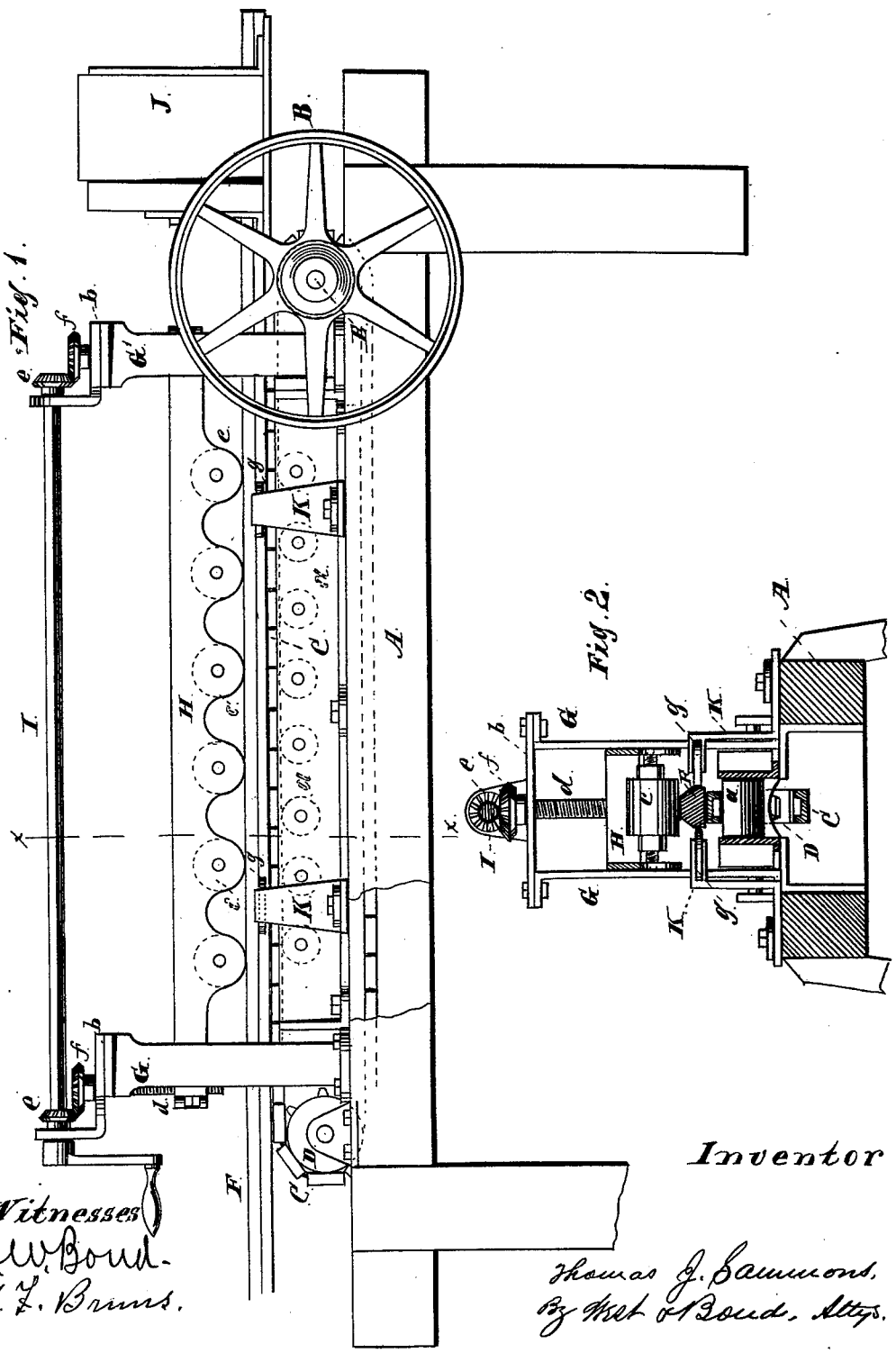

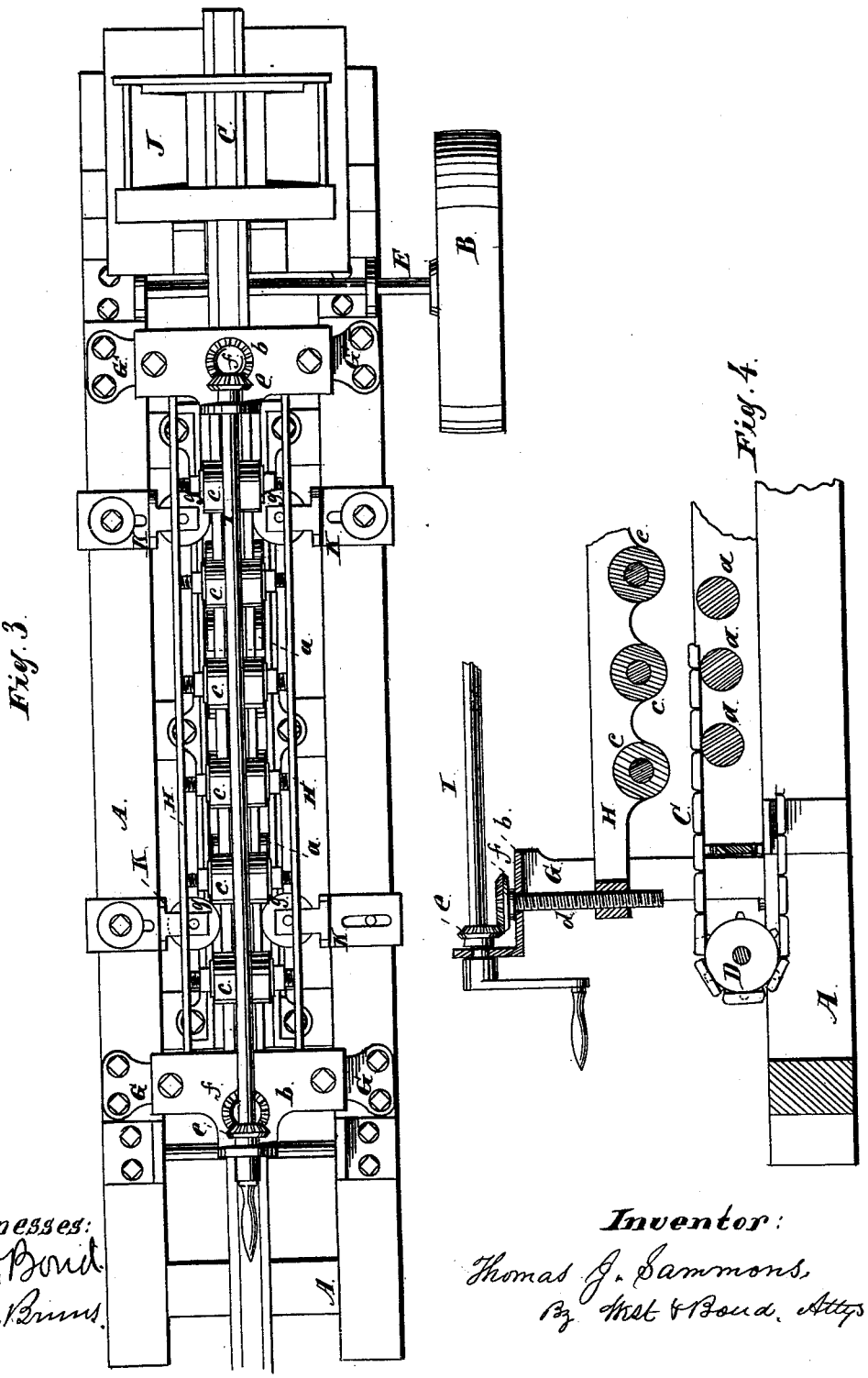

THOMAS J. SAMMONS, OF CHICAGO, ILLINOIS.

IMPROVEMENT IN MACHINES FOR APPLYING COMPOSITION TO MOLDINGS.

Specification forming part of Letters Patent No. 218,831, dated August 26, 1879; application filed February 24, 1879.

*To all whom it may concern:*

Be it known that I, THOMAS J. SAMMONS, of Chicago, Cook county, State of Illinois, have invented a new and useful Improvement in Machines for Applying Composition to Moldings, of which the following is a full description, reference being had to the accompanying drawings, in which—

Figure 1 is a side elevation; Fig. 2, a vertical cross-section at $x$ of Fig. 1. Fig. 3 is a plan; Fig. 4, a vertical longitudinal section so far as represented.

In manufacturing moldings of a certain kind it is common to apply a composition to the face of the molding by passing the same through a receptacle containing the composition, which must be done several times to complete the process and make a finished marketable molding.

It has been customary to feed the strips of molding to the composition by devices acting upon the edges of such strips, and hence it has not been possible in this way to apply the composition properly to such edges, because the action of the feeding devices upon the composition upon such edges crushes it. It is not practical to feed the strips by means of the ordinary feed-rollers placed above and below the strip, because the action of such feed-rollers upon the composition cracks, crushes, and injures it. Especially will this be so when the strip remains stationary for a moment while the feed-rollers continue to rotate, which will frequently happen in practice. The same result will follow if the strip is not fed at a uniform speed.

The object of my invention is to construct a machine by the use of which strips of moldings can be fed to a receptacle containing composition in such manner that the composition can be applied to the edges as well as to the top of the strip, if desired, and so that the action of the feeding devices will not injure the molding after the process of applying the composition has been partially completed; and this I accomplish by means of an endless chain or belt, and by means of elastic pressure-rolls and guides, by the use of which the strips of molding can be fed forward without injury thereto, as hereinafter more fully described and claimed.

In the drawings, A is the main frame. B is a driving-pulley. C is an endless chain, which passes over two sprocket-wheels, one of which is shown at D. The other is on the shaft E of the driving-pulley.

F is a strip of molding, which is supported upon the chain or belt C. $a$ are rollers, over which the upper portion of the chain passes, for the purpose of keeping the chain in line and up against the strip F.

G G' are standards secured to the main frame. Upon the top of each pair of these standards is a cross-bar, $b$.

$c$ are a number of rollers, which are made of rubber or other suitable elastic material. They are pivoted in bearings in a suitable movable frame, H, which is located between the standards G G'. This frame can be raised and lowered by means of screws $d$, which pass through nuts, one in each end of the frame H, the screws being operated by the shaft I and bevel-gear wheels $e$ $f$.

$g$ are elastic guide-rollers arranged along the edges of the strip F. They are supported in suitable standards K, which can be adjusted as the width of the molding requires.

J is a receptacle for the composition to be applied to the molding, which is constructed and arranged on the frame A in the usual manner. The strips of molding pass through this receptacle and receive a portion of the composition therein contained.

The operation of this machine is as follows: The frame which carries the elastic rollers $c$ is to be raised far enough to permit a strip of molding to be placed on the endless chain or belt C. Then this frame H is to be lowered, bringing the elastic rollers $c$ down upon the face of the molding with such pressure as may be required to hold the molding against the chain with such force as may be necessary to enable it to be fed forward by the movement of the chain, and the guide-rollers $g$ are to be so adjusted that the strip will be kept in line. Then, the driving-pulley B being in motion, the strip will be fed forward through the receptacle J by the movement of the chain C.

It is to be noticed that the rollers $c$ do not act as feed-rollers. They are only pressure-rollers, holding the strip F in contact with the chain C with sufficient force; and these rollers

*c* only revolve when the strip is in motion, and their speed always corresponds with that of the molding, so that if the molding stops, or if its speed varies, the rollers *c* also stop, or their speed varies correspondingly. These rollers *c* being adjustable vertically, they can be used with different thicknesses of moldings, and the pressure can be varied as circumstances may require. The face of the moldings will not be injured by these rollers *c*, because they do not act upon the same, only rotating as they are moved along by the moving molding.

The rollers *g* are only guides, and do not aid in feeding the strip. As they are elastic, the composition which may have been applied to the edges of the strip will not be injured by the passage of the same between such rollers *g*.

The distance between the two sprocket-wheels may be about seven feet. I use a number of the elastic rollers *c*, so that the pressure upon the strip is distributed over, say, about five feet in length, and the pressure of each roller on the strip is not great, while the combined pressure of the several rollers *c* on the strip is sufficient to accomplish the desired result without injury to the face of the strip after the process of applying the composition has been partly completed.

The rollers *c* might be supported in a single bearing by making a long box and journal, in which case one side of the frame H could be omitted. This construction will be desirable for certain kinds of moldings of peculiar form. The form of these pressure-rollers *c* may be varied, if occasion requires.

Instead of the rollers *a*, over which the chain runs, a solid bed might be used, or stationary strips; but this would increase the friction, and hence is not as desirable as the rollers.

I have shown an endless chain, C; but a belt may be used in place of the chain.

Owing to variations in the thickness of a strip of molding, or to imperfections therein, or from other cause, it will be found in practice that the strip will not be uniformly fed. Hence it is desirable to have the rollers *c* so arranged in a frame that they can be simultaneously and quickly raised or lowered.

It is not necessary to have the rollers *c* separately adjustable; but it will be well to make them so that they can be each adjusted independently of the other, because in use it is not likely that they will wear away uniformly, and when one wears more rapidly than another it can be adjusted as may be necessary to maintain a uniform pressure.

What I claim as new, and desire to secure by Letters Patent, is as follows:

1. In a machine for applying composition to moldings, the combination, with the endless chain or belt C, of a series of elastic rollers, *c*, and vertically-adjustable roller-frame H, whereby the elastic rollers can be raised or their pressure adjusted together, substantially as specified.

2. The combination of the adjustable frame H and elastic rollers *c* with the endless chain or belt C and guide-rollers *g*, all substantially as described.

THOMAS J. SAMMONS.

Witnesses:
E. A. WEST,
O. W. BOND.